United States Patent
Wang

(10) Patent No.: US 7,792,082 B2
(45) Date of Patent: Sep. 7, 2010

(54) DYNAMIC EXPANSION OF A FRAME SELECTION INTERVAL IN A WIRELESS COMMUNICATION NETWORK

(75) Inventor: Jin Wang, Lisle, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 687 days.

(21) Appl. No.: 11/769,981

(22) Filed: Jun. 28, 2007

(65) Prior Publication Data

US 2009/0003300 A1    Jan. 1, 2009

(51) Int. Cl.
    *H04W 4/00* (2009.01)
(52) U.S. Cl. ...................... 370/331; 455/436
(58) Field of Classification Search ................ 370/340, 370/310, 324, 350, 331, 301, 395.4, 468, 370/506, 521, 341, 332, 347, 334, 231.1, 370/235, 236, 465, 469, 474, 476, 394, 337; 455/436–439, 442–446, 524, 525, 418–421, 455/422.1, 450, 451, 452.1
See application file for complete search history.

(56) References Cited

U.S. PATENT DOCUMENTS

| | | | |
|---|---|---|---|
| 6,285,668 B1* | 9/2001 | Kang | 370/331 |
| 6,754,495 B2* | 6/2004 | Kusaki et al. | 455/436 |
| 6,973,308 B1 | 12/2005 | Smith | |
| 7,031,701 B1* | 4/2006 | Ahmavaara et al. | 455/423 |
| 2004/0042426 A1* | 3/2004 | Harris et al. | 370/331 |
| 2005/0025194 A1* | 2/2005 | Adjakple et al. | 370/516 |
| 2005/0250511 A1 | 11/2005 | Xiao et al. | |
| 2007/0094703 A1 | 4/2007 | Nygaard et al. | |

FOREIGN PATENT DOCUMENTS

WO    WO2008037855 A1    4/2008

* cited by examiner

*Primary Examiner*—Kent Chang
*Assistant Examiner*—San Htun
(74) *Attorney, Agent, or Firm*—Duft Bornsen & Fishman, LLP

(57) ABSTRACT

Methods and systems are provided for dynamically expanding and retracting a frame selection interval in a wireless communication network. A frame selector receives a sequence of frames for a call from each of a plurality of base stations serving a mobile communication device for the call, and performs a frame selection process based on an initial selection interval to select a best frame from the sequence of frames received from each of the base stations during each instance of the initial selection interval. The frame selector is adapted to track the presence and absence of late or early frames, and uses this information to dynamically expand the frame selection interval when late or early frames are detected. The frame selector then performs the frame selection process based on the expanded selection interval to select the best frame from the sequence of frames during subsequent instances of the expanded selection interval.

20 Claims, 8 Drawing Sheets

DYNAMIC EXPANSION OF A FRAME SELECTION INTERVAL IN A WIRELESS COMMUNICATION NETWORK

BACKGROUND OF THE INVENTION

1. Field of the Invention

The invention is related to the field of communications, and in particular, to methods and apparatuses for expanding and retracting a frame selection interval in a wireless communication network.

2. Statement of the Problem

Spread spectrum wireless communication networks, such as code division multiple access (CDMA) 3G1x and EVDO, utilize soft handoffs (SHO) for voice and packet data applications. A mobile communication device engaged in a voice or data call communicates with one or more base stations simultaneously in a state known as SHO. Each base station has a call leg over a backhaul that transports voice traffic or data traffic as a sequence of frames (known as reverse frames) from the base station to a mobile switching center (MSC). Each base station transmits essentially the same frame data corresponding to the same digitized portion of a call to the MSC. The MSC has a frame selector that selects the "best" frame received from the base stations associated with the call during each instance of a frame selection interval (e.g., every 20 ms). The frame selector then transmits the best frame to other higher protocol layers (e.g., other network elements) or peer layers of the wireless communication network, such as a vocoder (for a circuit voice call), a Radio Link Protocol (RLP) entity (for a packet data call), or another frame selector (for a Transcoder Free Operation or TrFO call), for further processing and/or transmission to the destination of the call.

The frame selector further transmits a sequence of frames (known as forward frames) corresponding to the other end of the call to each base station during a similar interval period (e.g., 20 ms) for transmission to the mobile communication device. Included in the forward frames is information regarding the "best" frame (i.e., the best leg of the SHO) selected of the reverse frames. The base stations use this feedback information to perform power control (i.e., adjusting their transmission power), which allows spread spectrum systems (e.g., CDMA) to achieve maximum air-interface efficiency and call capacity.

The frame selector expects reverse frames from all of the call legs to arrive within a tight selection interval during each instance of the frame selection intervals. This means that the differential delay between the first frame received during an instance of the selection interval and the last frame received during an instance of the selection interval cannot exceed a certain limit for the frame selector to operate properly. Otherwise, the frame selector cannot compare a frame received from a first base station to a frame received from a second base station to select the best frame. Instead, the frame selector can only utilize frames received during the selection interval to perform the frame selection process. As new backhaul transport types (e.g. Ethernet and T1/E1-based IP backhaul or WiMax based IP backhaul) are introduced, the variations of the backhaul delay can be significantly larger than the delay of frame relay backhauls. As such, the differential delay among the new backhaul types and that between the new and the traditional frame relay backhaul can exceed the current limit for frame selection. Because of the expanded one-way and differential delays, calls and call legs are more likely to drop when the user carrying a mobile communication device in an active call moves across the boundary areas, as reverse frames from these "new backhaul" legs may arrive at the frame selector too late for frame selection, as well as to provide prompt feedback to the base stations.

SUMMARY OF THE SOLUTION

The invention solves the above problems and other problems by providing systems and methods for expanding a frame selection interval in response to the presence or absence of outlier frames, which is utilized by a frame selector in a wireless communication network. A frame selector receives a sequence of frames for a call from each of a plurality of base stations serving a mobile communication device for the call, and performs a frame selection process based on an initial selection interval to select a best frame from the sequence of frames received from each of the base stations during each instance of the initial selection interval. The frame selector is adapted to track the presence and absence of late or early frames, and uses this real-time information to dynamically expand the frame selection interval when late or early frames are detected. The frame selector then performs the frame selection process based on the expanded selection interval to select the best frame from the sequence of frames received from each of the base stations during subsequent instances of the expanded selection interval. Further, once late or early frames (in relation to the period of the initial selection interval) are no longer detected, then the expanded selection interval can be retracted (for example to the initial selection interval). Advantageously, the frame selector can deploy necessary resources (such as a larger frame selection buffer and a higher CPU budget) when these resources are needed to ensure inclusion of late or early frames in the expanded selection interval and minimize call drops or call leg drops. If the expanded selection interval is no longer needed, then the expanded selection interval may be retracted to the initial selection interval, eliminating the impact on the power control of the base stations associated with the expanded selection interval. This helps achieve maximum air-interface efficiency and call capacity.

One embodiment of the invention comprises a frame selector in a wireless communication network. The frame selector comprises an interface system adapted to receive a sequence of frames for a call from each of a plurality of base stations serving a mobile communication device for the call. The frame selector further comprises a processing system adapted to perform a frame selection process based on an initial selection interval to select a best frame from the sequence of frames received from each of the base stations during each instance of the initial selection interval. The frame selector is further adapted to detect an outlier frame of the sequence of frames received from at least one of the base stations outside of the initial selection interval during at least one instance of the initial selection interval and expand the initial selection interval to an expanded selection interval responsive to detecting the outlier frame. The frame selector is further adapted to perform the frame selection process based on the expanded selection interval to select the best frame from the sequence of frames received from each of the base stations during subsequent instances of the expanded selection interval. In another embodiment of the invention, the expanded selection interval may be retracted once the frame selector that the expanded selection interval is no longer needed (i.e., when the frame selector determines that late or early frames with respect to the initial selection interval are no longer being received during instances of the expanded selection interval).

Another embodiment of the invention is wireless communication network comprising a plurality of base stations adapted to simultaneously receive call traffic from a mobile communication device and forward the call traffic as a sequence of frames, a backhaul network adapted to transmit the sequence of frames for each of the base stations, and a frame selector adapted to receive the sequence of frames from each of the base stations through the backhaul network. The frame selector is further adapted to perform a frame selection process based on an initial selection interval to select a best frame from the sequence of frames received from each of the base stations during each instance of the initial selection interval, and detect an outlier frame of the sequence of frames received from at least one of the base stations outside of the initial selection interval during at least one instance of the initial selection interval. Responsive to detecting the outlier frame, the frame selector is adapted to expand the initial selection interval to an expanded selection interval, and perform the frame selection process based on the expanded selection interval to select the best frame from the sequence of frames received from each of the base stations during subsequent instances of the expanded selection interval.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-11 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention.

Those skilled in the art will appreciate that the features described below may be combined in various ways to form multiple variations of the invention. As a result, the invention is not limited to the specific embodiments described below, but only by the claims and their equivalents.

Figure 1:
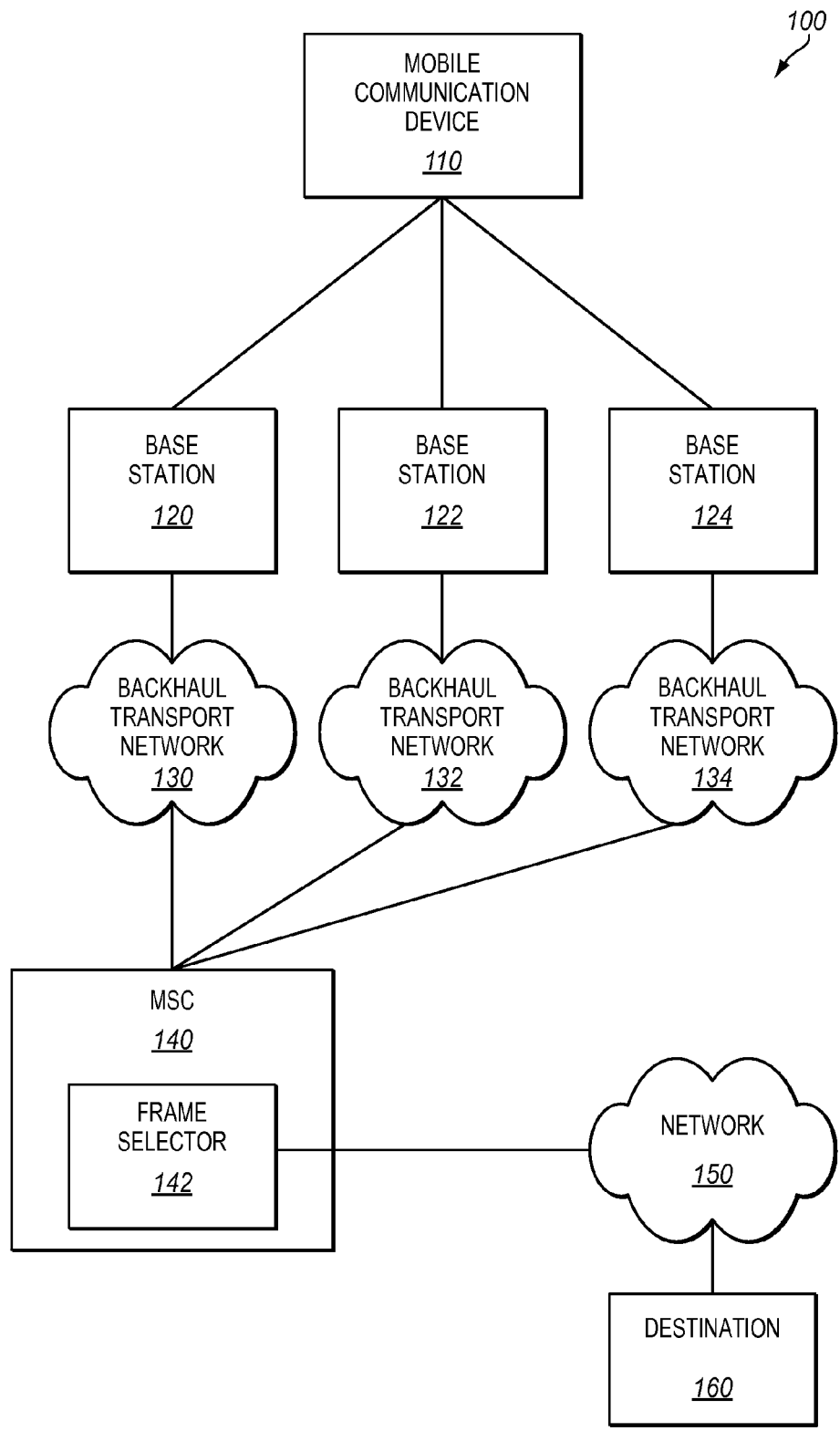
FIG. 1 illustrates a wireless communication network in an exemplary embodiment of the invention.

FIG. 1 illustrates a wireless communication network 100 in an exemplary embodiment of the invention. Wireless communication network 100 comprises a mobile communication device 110, such as a cellular telephone, mobile PDA or other mobile communication device, which is adapted to wirelessly communicate simultaneously with one or more base stations 120-124. Mobile communication device 110 communicates with base stations 120-124 in a state known as SHO. Mobile communication device 110 transmits essentially the same data corresponding to the call to each base station 120-124, and receives essentially the same data corresponding to the call from each base station 120-124. Those of ordinary skill in the art will recognize that there will be some differences in the frames, such as the identity of the base station transmitting the frame, etc. However, the call content of each frame will essentially be identical.

Base stations 120-124 are adapted to receive data corresponding with a call from mobile communication device 110, and transmit the data as a sequence of frames to a mobile switching center (MSC) 140. Base stations 120-124 are further adapted to receive frames corresponding with a call from MSC 140, and wirelessly transmit the frames to mobile communication device 110. For example, base stations 120-124 may be adapted to receive data corresponding with a call every 20 ms from mobile communication device 110 and transmit a reverse frame comprising the data to MSC 140, as well as receive a forward frame corresponding to the call every 20 ms from MSC 140, and transmit the data of the reverse frame to mobile communication device 110.

Base stations 120-124 are connected to MSC 140 over one or more backhaul transport networks 130-134. Backhaul transport networks 130-134 may be any type of backhaul network, such as a frame relay network or an Ethernet and T1/E1 based IP network, a wireless IP backhaul network, (e.g., WiMax), etc. In one embodiment, two or more base stations 120-124 may be adapted to share a backhaul network 130-134. As used herein, the connection between MSC 140 and any one of base stations 120-124 may be referred to as a leg for a given call. Thus, a leg may also refer to any of backhaul networks 130-134 over which the payload of a call is transmitted.

MSC 140 comprises a frame selector 142 that is adapted to perform a frame selection process to select frames from the sequences of frames received from base stations 120-124. Frame selector 142 is adapted to utilize defined criteria to select the "best" frame (reverse frames) received from base stations 120-124 during each instance of a selection interval (e.g., every 20 ms). Frame selector 142 then transmits the best frame to other network elements (e.g. higher layer protocols) of the network (not shown), such as a vocoder (for a circuit voice call), a Radio Link Protocol (RLP) entity (for a packet data call), or another frame selector (for a Transcoder Free Operation or TrFO call), for further processing and delivery over a network 150 to a destination 160. Frame selector 142 may be further adapted to receive data from a destination 160, and transmit the data as forward frames to base stations 120-124. Included in the forward frames is feedback information that is utilized by base stations 120-124 to perform power control.

MSC 140 may also include a Base Station Controller (BSC) (not shown), Radio Network Controller (RNC) (not shown), Radio Network (RN) (not shown), or Access Network (AN) (not shown). Further, wireless communication network 100 may comprise additional elements not shown for the sake of brevity.

Figure 2:
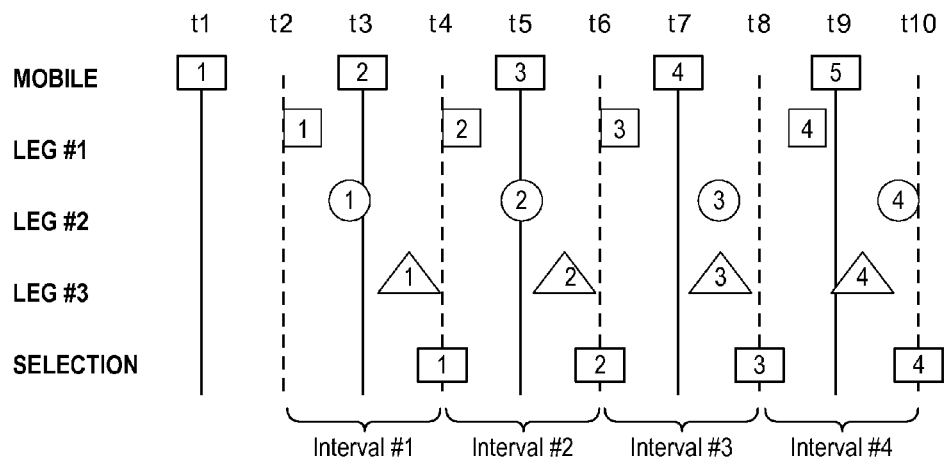
FIG. 2 illustrates a typical timing diagram for frame selection using a standard selection interval in an exemplary embodiment of the invention.

FIG. 2 illustrates a typical timing diagram for frame selection using a standard selection interval in an exemplary embodiment of the invention. FIG. 2 will be discussed in reference to wireless communication network 100 illustrated in FIG. 1. Mobile communication device 110 (see FIG. 1) transmits data packet #1 (labeled as mobile) at time t1, data packet #2 at time t3, data packet #3 at time t5, data packet #4 at time t7 and data packet #5 at time t9. Data packets and data frames are used interchangeably herein. Base stations 120, 122 and 124 receive the data packets, and forward the data packets over backhaul networks 130, 132 and 134 (illustrated as leg #1, leg #2 and leg #3), respectively. The timing diagram illustrates the arrival of frames at frame selector 142 from legs #1-3. The actual number of call legs over the course of a call may vary based on air-interface conditions, a user's mobility patterns, etc. Frame selector 142 then performs a frame selection process at the end of each instance of the selection interval to determine the "best" frame, and transmits the best frame to a higher layer protocol. Normally, selection interval #1 is between times t2 and t4, and frame selector 142 receives each of the frames #1 from backhaul networks 130-134 during selection interval #1. Thus, frame selector 142 can complete the frame selection process between all of frames #1 by time t4, and transmit the "best" frame #1 to other elements (not shown) of wireless communication network 100 for further processing. Those of ordinary skill in the art will recognize that the timing diagram has been simplified for illustrative purposes. As a result, some events, such as the frame selection decision, and the ending of a selection interval, as well as adding or dropping of a call leg during the course of a call, may not occur simultaneously, but are illustrated as such for simplicity of the discussion.

Figure 3:
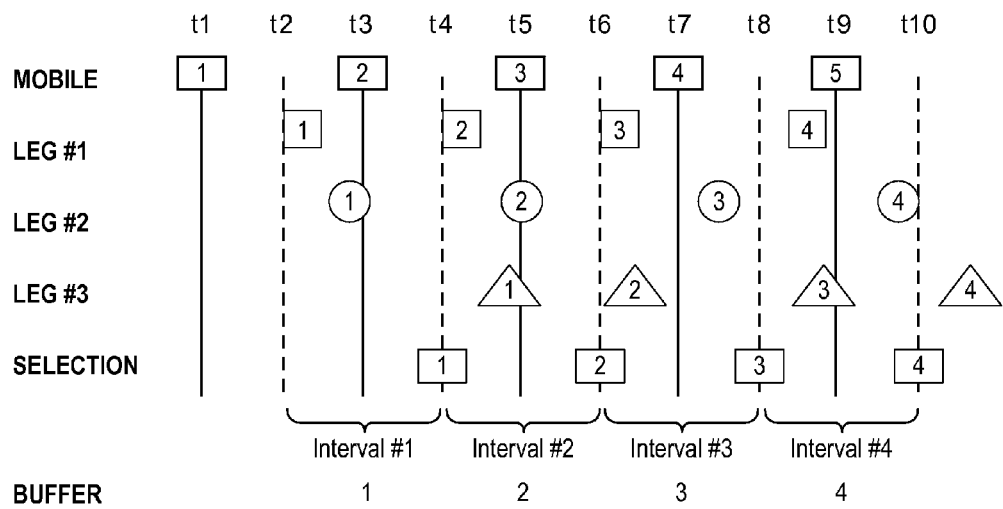
FIG. 3 illustrates a scenario of the timing diagram of FIG. 1 when a frame selector is receiving frames from one leg of the backhaul network of FIG. 1 outside of the expected selection interval.

A problem arises when frame selector 142 receives frames outside of the expected selection interval for the frames from one or more legs. FIG. 3 illustrates a scenario of the timing diagram of FIG. 2 when frame selector 142 is receiving frames outside of the expected selection interval for the frames from one leg. FIG. 3 will be discussed in reference to wireless communication network 100 illustrated in FIG. 1.

Mobile communication device 110 transmits data packet #1 at time t1, and selection interval #1 of frame selector 142 for frames corresponding with data packet #1 is between times t2 and t4. Frame selector 142 receives frames #1 from leg #1 (e.g., backhaul network 130) and leg #2 (e.g., backhaul network 132) during selection interval #1. However, frame #1 from leg #3 (e.g., backhaul network 134) is not received during selection interval #1. Because frame selector 142 makes a frame selection for selection interval #1 at time t4, frame #1 from leg #3 will arrive after the frame selection is made, and thus, may be discarded even if it is the "best" frame.

If this late arrival situation occurs for multiple selection intervals, then frame selector 142 may drop leg #3. This late arrival situation frequently occurs when one or more legs are new backhaul types such as IP-based backhaul or WiMax links, while other legs use traditional frame relay backhauls. If frame #1 from leg #3 happens to be the best quality frame, then frame selector 142 may be dropping the best leg. As a result, the call may be dropped if the dropped leg is the "primary" leg where the associated base station 124 controls the call.

Figure 4:
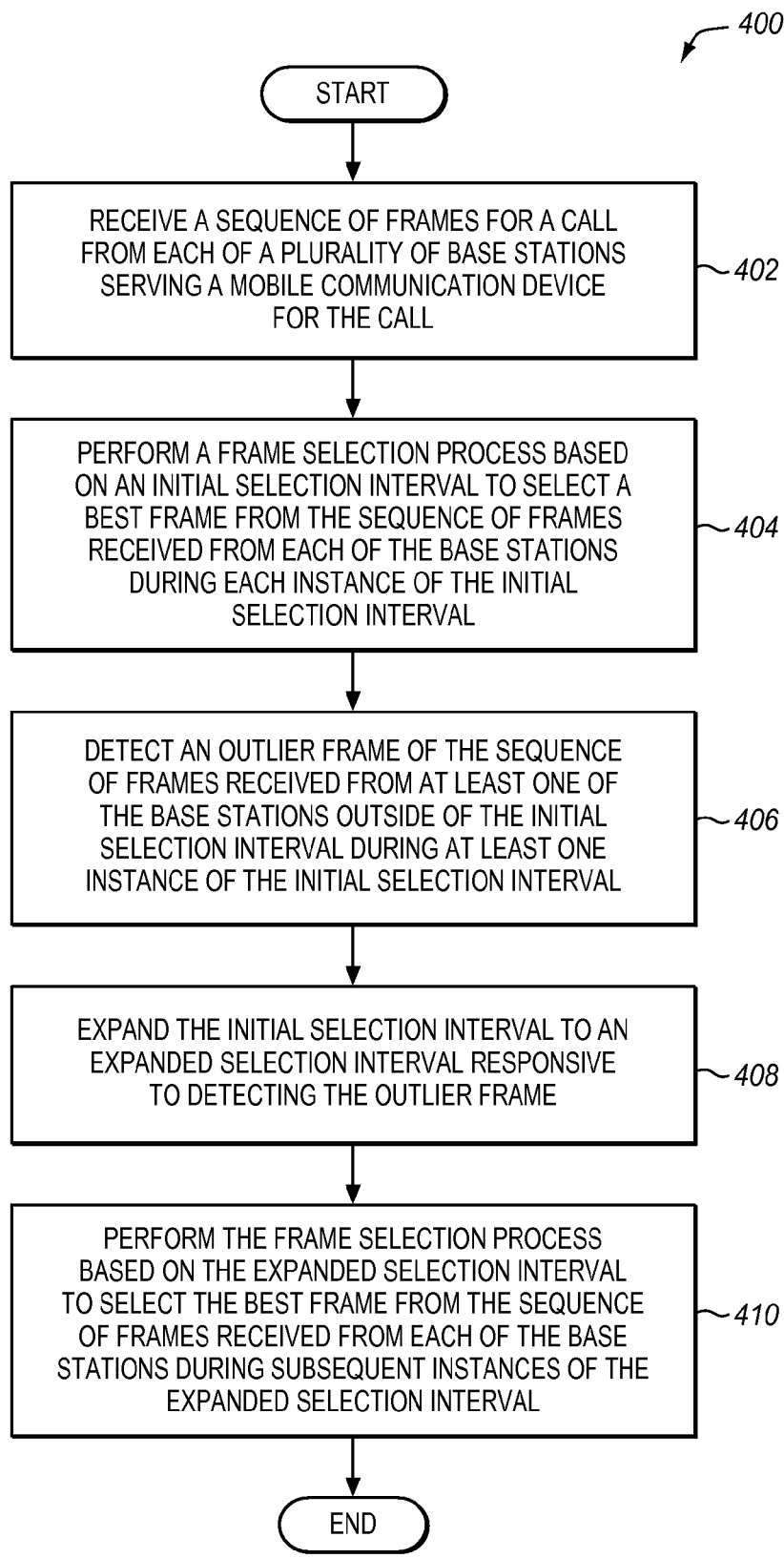
FIG. 4 illustrates a method for expanding a frame selection interval in a wireless communication network in an exemplary embodiment of the invention.

FIG. 4 illustrates a method 400 for expanding a frame selection interval in a wireless communication network in an exemplary embodiment of the invention. Method 400 will be discussed in reference to wireless communication network 100 of FIG. 1. The steps of method 400 are not all-inclusive, and may include additional steps not shown for the sake of brevity.

In step 402, frame selector 142 receives a sequence of frames for a call from each of a plurality of base stations 120-124 serving a mobile communication device 110 for the call. In step 404, frame selector 142 performs a frame selection process based on an initial selection interval to select a best frame from the sequence of frames received from each of the base stations 120-124 during each instance of the initial selection interval. An initial selection interval is defined for the frame selection process, such as 20 ms. For example, the initial selection interval may be the period between times t2 and t4 of FIG. 3. At time t4, frame selector 142 makes a selection of the best frame received from each of the legs. The best frames may then be transmitted to a higher protocol layer.

Figure 5:
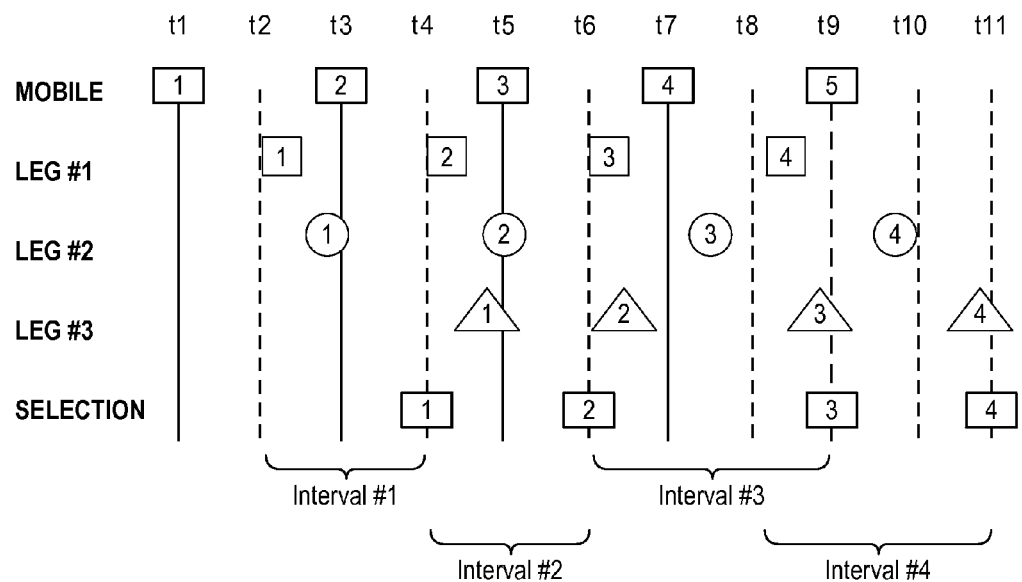
FIG. 5 illustrates a timing diagram for frame selection in accordance with the method of FIG. 4 in an exemplary embodiment of the invention.
Figure 6:
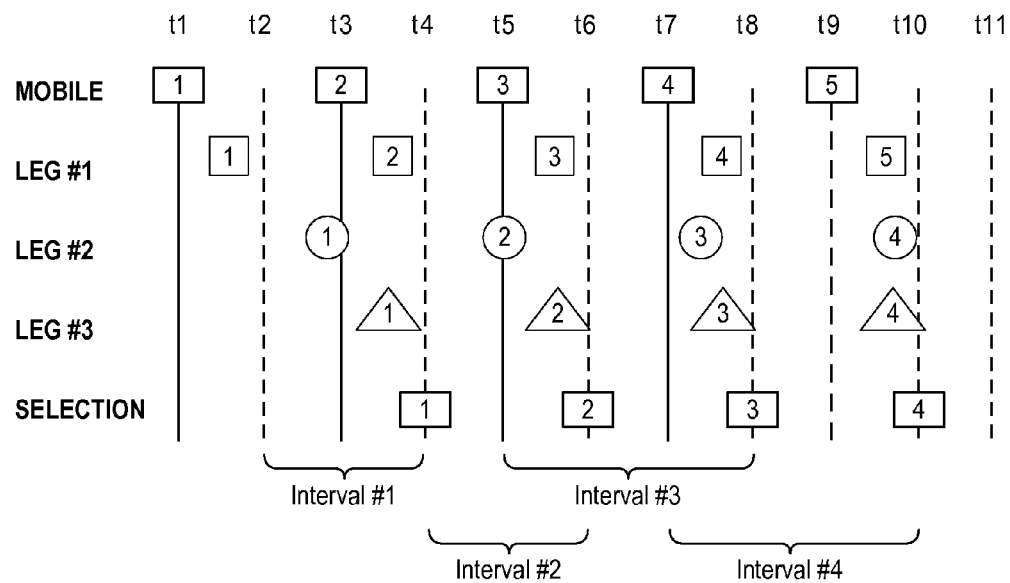
FIG. 6 illustrates another timing diagram for frame selection in accordance with the method of FIG. 4 in an exemplary embodiment of the invention.

At some point during the frame selection process, frame selector 142 may detect an outlier frame of the sequence of frames received from at least one of the base stations outside of the initial selection interval during at least one instance of the initial selection interval in step 406. FIG. 5 illustrates a timing diagram for frame selection in accordance with method 400 of FIG. 4 in an exemplary embodiment of the invention. Frame selector 142 may detect that frame #1 (see FIG. 5) received from leg #3 was received outside of selection interval #1 (e.g., beyond time t4). Instead, frame #1 from leg #3 was received during selection interval #2 (i.e., between times t4 and t6). In one embodiment, frame selector 142 may also detect reception of an early frame. For example, frame selector 142 may receive frame #1 from leg #1 before time t2 (i.e., before the beginning boundary of selection interval #1) (see FIG. 6).

Responsive to detecting the late outlier frame (e.g., late frame #1 from leg #3 in FIG. 5) or the early outlier frame (e.g., early frame #1 from leg #1 in FIG. 6), frame selector 142 expands the initial selection interval to an expanded selection interval in step 408. The expanded selection interval may be expanded at least by a time based on a differential time period between a boundary of the initial selection interval and a time the outlier frame is received that is outside of the initial selection interval. If the outlier frame (e.g., frame #1 from leg #1) is received early from one of the base stations 120-124, then the boundary may be a beginning boundary (e.g., time t2 in FIG. 6) of the initial selection interval (e.g., selection interval #1). If the outlier frame (e.g., frame #1 from leg #3) is received late from one of the base stations 120-124, then the boundary may be an ending boundary (e.g., time t4 in FIG. 5) of the initial selection interval (e.g., selection interval #1).

Referring to FIG. 5, the initial selection interval is illustrated as the period between times t2 and t4 (as well as the period between times t4 and t6). Thus, frame selector 142 expands the period of the selection interval during the third instance of the selection interval (i.e., at time t6). Thus, selection interval #3 will be the period between times t6 and t9 rather than the period between times t6 and t8. In another embodiment, the expansion of the selection interval can occur earlier than the third instance (e.g. during the second instance or even the first instance), and the expanded selection interval may have a longer time period as well. For late frames the beginning boundaries of each instance of the expanded selection interval may remain the same as the beginning boundaries of each instance of the initial selection intervals such that two selection intervals may overlap. However, the ending boundaries of each selection interval may change to allow expansion of the selection interval. This expanded selection interval allows frame selector 142 to accommodate late frames received from one or more backhaul legs (e.g., backhaul network 134). Similarly for early frames the beginning boundaries of each instance of the expanded selection interval may shift backward in time to accommodate early frames, while the ending boundaries of each selection interval is changed accordingly such that the total selection interval remains expanded.

In step 410, frame selector 142 performs the frame selection process based on the initial selection interval to select the best frame from the sequence of frames received from each of the base stations 120-124 during subsequent instances of the initial selection interval. Thus, during selection interval #3 (see FIG. 5), frame selector will make a "best" frame selection at time t9, rather than at time t8. Likewise, during selection interval #4, frame selector 142 will make a "best" frame selection at time t11 rather than at time t10.

Advantageously, frame selector 142 can expand the selection interval when needed to ensure inclusion of late or early frames in the expanded selection interval and minimize call drops or call leg drops. This provides a higher level of quality of service for users of wireless communication network 100, who might otherwise experience dropped calls or reduced quality calls. Additionally, the inclusion of frames which otherwise may be early and/or late in relation to their associated frame selection interval allows frame selector 142 to include frames received from a plurality of base stations 120-124 in the frame selection process which may be of the best quality, but which normally would be excluded from the frame selection process due to their late arrival at frame selector 142. With late frames included in the best frame selection, the "best leg" information carried ("piggybacked") to base stations 120-124 by the forward frames will correctly reflect the best, though late, frames selected that are otherwise unavailable for the frame selection without operation method 400. This improves the accuracy of the feedback to base stations 120-124 for power control. Further, frame selector 142 (along with base stations 120-124) is less likely to drop a call leg serving mobile communication device 110. Thus, users of wireless communication network 100 may experience higher quality calls as a result of the operation of frame selector 142 enhanced in accordance with method 400.

As illustrated above, the expanded frame selection interval utilized by frame selector 142 has certain advantages over the prior art. However, an expanded frame selection interval may require deployment of additional resources (such as a larger frame selection buffer to accommodate more buffered frames, as well as a higher CPU budget for processing and selecting late frames). Further, the expanded frame selection interval may impact the effectiveness or promptness of the power control because piggybacked information in the forward frames (i.e., frames transmitted by frame selector 142 to base stations 120-124) is delayed due to the deferred frame selection necessary to accommodate late reverse frames. The impact on the power control (and thus on the air-interface capacity of wireless communication network 100) is a tradeoff for expanding the frame selection interval to avoid call and call leg drops.

As mobile communication device 110 moves around wireless communication network 100, the set of call legs (e.g., the set of base stations 120-124 and backhaul networks 130-134) may change as additional SHO legs are added and some SHO legs are dropped due to the new location of mobile communication device 110. In a backhaul network mixed with traditional backhaul links (such as frame relay networks) and delay expanded networks (such as Ethernet and T1/E1-based IP networks and WiMax), the differential delay (i.e., the delay between an arrival of a first frame during a selection interval and an arrival of a last frame during the same selection interval) changes as the set of call legs changes. It is possible, for example, that a call starts with a set of call legs having a large differential delay calling for expanded selection intervals (as described in method 400 of FIG. 4), but later the set of call legs changes as mobile communication device 110 moves around, resulting in a "normal" differential delay (i.e., with the respect to the initial selection interval described in method 400 of FIG. 4). When this situation occurs, the expanded selection interval no longer has any benefit to frame selector 142, yet frame selector 142 may still incur power control penalties and unnecessary processing of expanded selection intervals at frame selector 142.

Figure 7:
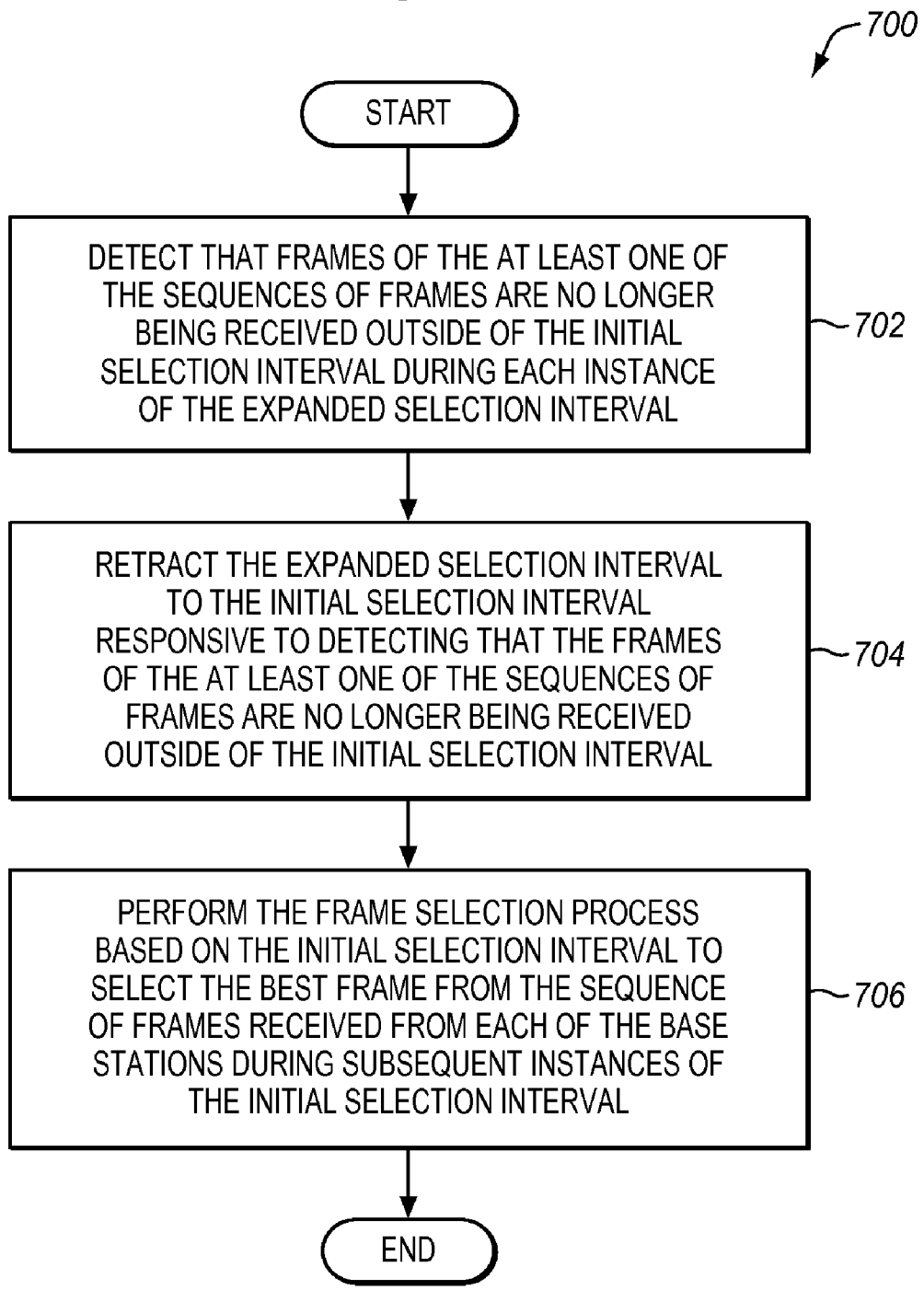
FIG. 7 illustrates a method for retracting an expanded selection interval in an exemplary embodiment of the invention.
Figure 8:
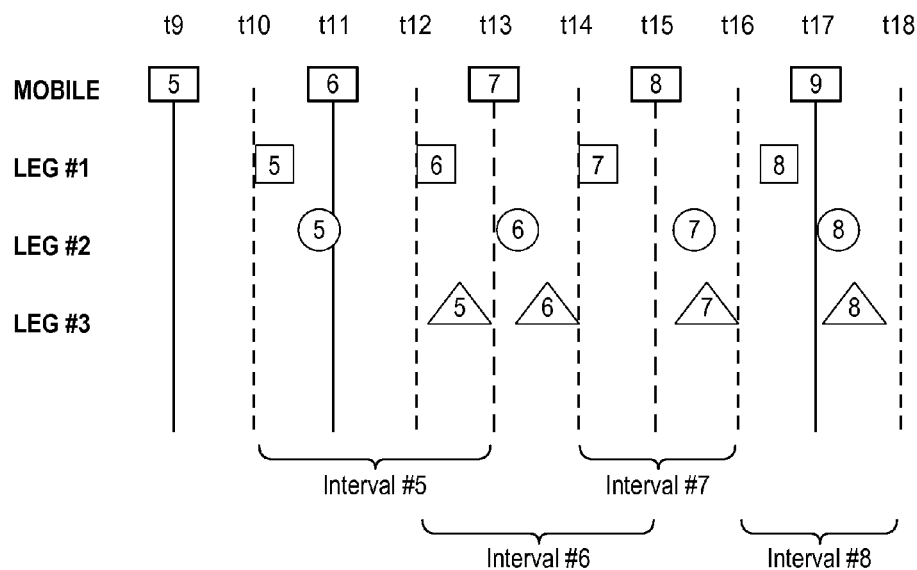
FIGS. 8-9 are timing diagrams of the frame selection intervals of the method of FIG. 7 in exemplary embodiments of the invention.

However, frame selector 142 may be further adapted to adjust or retract the selection interval to minimize the power control penalty when the expanded selection interval is no longer needed. FIG. 7 illustrates a method 700 for retracting an expanded selection interval in an exemplary embodiment of the invention. Method 700 will be discussed in reference to wireless communication network 100 of FIG. 1. The steps of method 700 are not all-inclusive, and may include additional steps not shown for the sake of brevity.

In step 702, frame selector 142 detects that frames of the sequences of frames which previously had been outliers are no longer being received outside of the initial selection interval during each instance of the expanded selection interval. For example, referring to FIG. 8, frame selector 142 receives frame #5 from leg #3 during expanded selection interval #5 (being between times t10 and t12). However, the arrival time of frame #5 from leg #3 is outside of what was the initial selection interval period (i.e., between times t10 and t11). However, during expanded selection interval #6 (i.e., between times t12 and t15), frame #6 from leg #3 actually arrives during what was the initial selection interval period (i.e., between times t12 and t14). Thus, frame selector 142 detects that a sequence of frames from leg #3 is no longer arriving late in relation to the initial selection interval.

Responsive to detecting that the frames of the at least one of the sequences of frames are no longer being received outside of the initial selection interval, frame selector 142 retracts the expanded selection interval to the initial selection interval in step 704. For example, referring to FIG. 8, frame selector 142 retracts selection interval #7 so that it has a time period between times t14 and t16 rather than a time period between times t14 and t17. Because frame selector 142 is no longer receiving frames from leg #3 outside of the initial selection interval, the retraction of the selection interval will not affect the frame selection process because the expanded selection interval is no longer needed, and allows frame selector 142 to eliminate the power control penalty. Further, frame selector 142 is able to reduce the resources (such as CPU processing time and additional buffer memory requirements) needed to serve the call, which increases the capacity of wireless communication network 100.

The retraction has been discussed in regard to returning the expanded selection interval to the initial selection interval. However, the retraction may also comprise reducing the selection interval to an intermediate selection interval that is between the initial selection interval and the expanded selection interval. As such, frame selector 142 may also be adapted to detect that the present length of the expanded selection interval is no longer necessary, but may determine that an expanded selection interval is still needed which is longer than the initial selection interval. Therefore, frame selector 142 may retract the expanded selection interval to an intermediate selection interval having a length which is between the initial selection interval and the expanded selection interval. For example, assume that the initial selection interval has a period of p1, and the expanded selection interval has a period of p2, which is greater than p1. Frame selector 142 may determine that a new selection interval is needed which has a length of p3 (which is less than p2 but greater than p1, i.e. p1<p3<p2). Thus, frame selector 142 may retract the expanded selection interval p2 to a retracted selection interval p3, and continue the frame selection process utilizing this retracted selection interval p3. If necessary, frame selector 142 may then retract the selection interval to the initial selection interval p1. The retraction transition path thus can be from p2 to p3 to p1 upon detecting that the length of selection interval p2 and p3 is too long, respectively. A similar transition path may occur for expansion of the selected interval. For example, the expansion transition path may be from p1 to p3 to p2, instead of from p1 to p2 if frame selector 142 determines that the expanded selection interval is not long enough. This, frame selector 142 can re-expand the expanded selection interval as necessary.

In step 706, frame selector 142 performs the frame selection process based on the initial selection interval to select the best frame from the sequence of frames received from each of the base stations 120-124 during subsequent instances of the initial selection interval. For example, frame selector 142 may select a best frame #7 at time t16 (i.e., the ending boundary of initial selection interval #7), and selects a best frame #8 at time t18 (i.e., the ending boundary of initial selection interval #8). Should frame selector 142 further detect that frames are again arriving late (or early) from one or more legs, then frame selector 142 may employ method 400 of FIG. 4 to again expand the selection interval.

Figure 9:
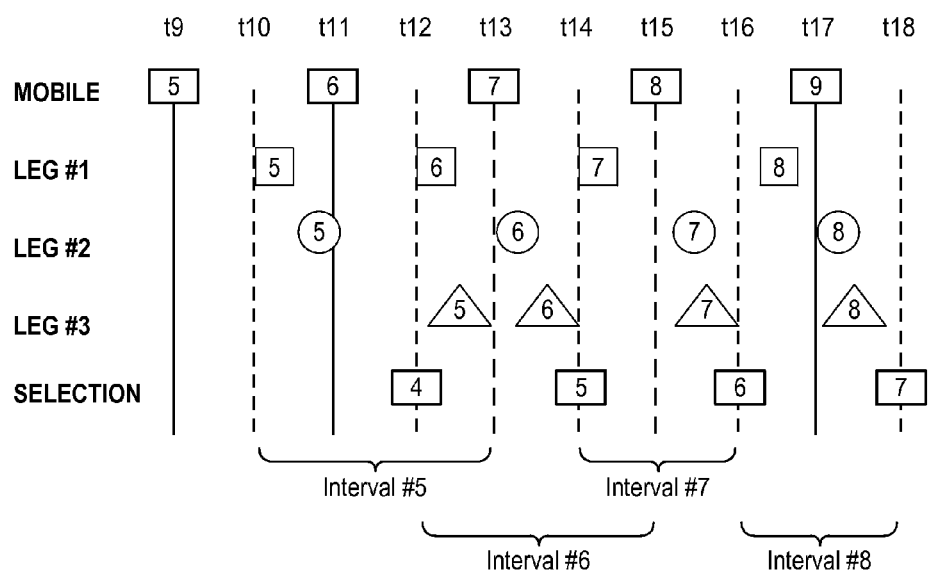

The retraction of the frame selection interval may result in storage of an extra buffered best frame received from the plurality of base stations, which needs to be properly sent to a higher protocol layer (such as a vocoder if it is a circuit voice call), or to a peer/far-end entity (e.g., another network element) if it is a TrFO/RTO (Transcoder Free Operation/Remote Transcoder Operation) call where vocoder local to frame selector 142 is bypassed. Referring to FIG. 9, during expanded selection interval #5, best frame #4 is transmitted by frame selector 142 to a higher protocol layer (illustrated as a vocoder) at time t12. During normal operation of frame selector 142, best frame #5 would normally be transmitted to the vocoder at time t12 by frame selector 142 instead of best frame #4. As a result, when the selection interval is retracted during selection interval #7, frame selector 142 will store one additional frame in the buffer that needs to be sent to a higher protocol layer.

When the frames comprise packet data traffic, the frame can be immediately sent to the higher protocol layer (e.g. Radio Link Protocol or RLP layer). However, when the frames comprise voice traffic, the additional buffered best frame can't be immediately sent to the vocoder, because the vocoder only accepts one frame per interval (i.e., one frame every 20 ms). As a result, frame selector 142 may be adapted to transmit the extra buffered frame during a least-impacting moment during the call, such as when an erasure is to be sent to the vocoder or upon receiving an eighty-rate reverse frame (also known as speak silence or a silence frame) that occurs naturally during two-way phone conversations.

Figure 10:
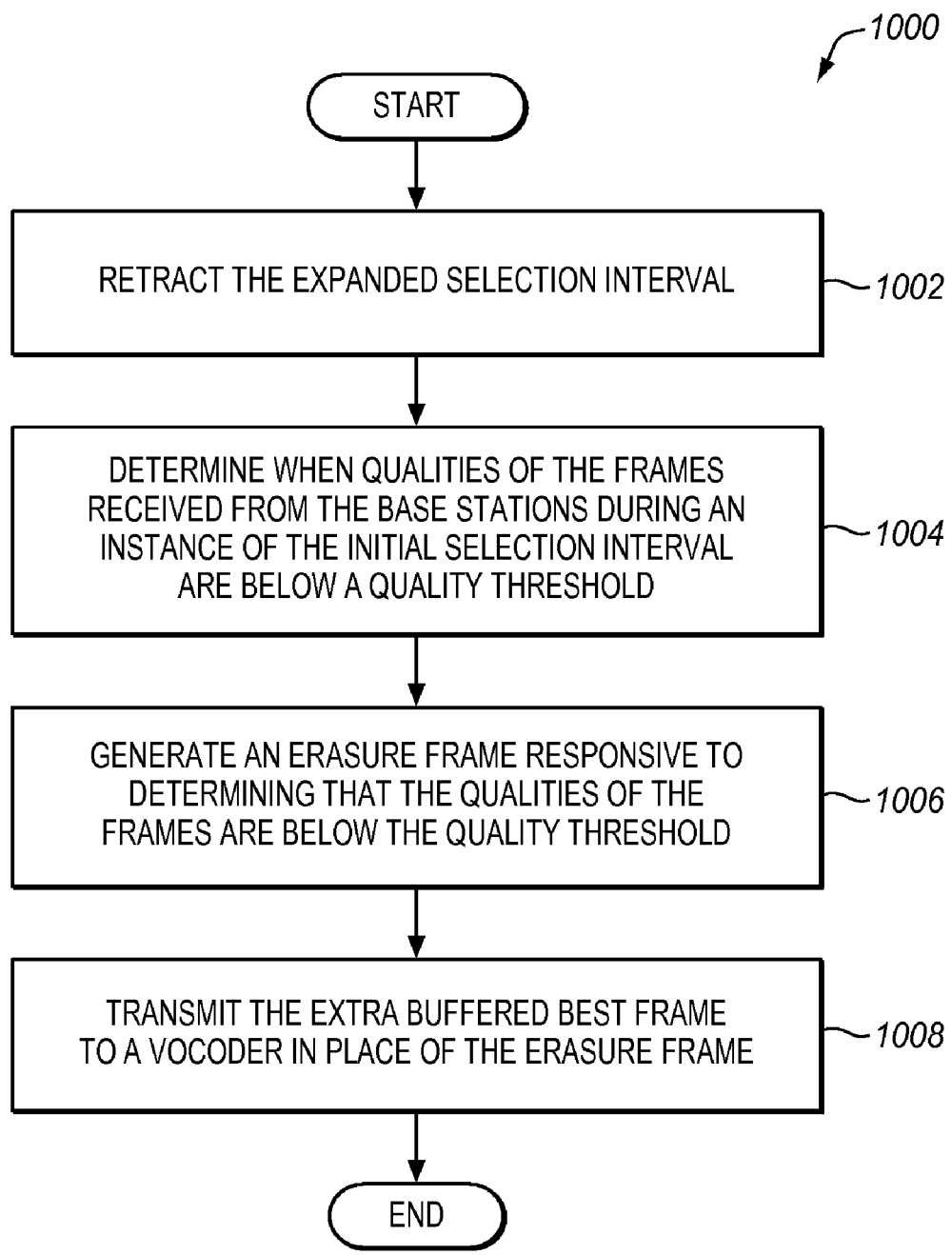
FIG. 10 illustrates a method for transmitting an extra buffered frame caused by a retracted selection interval in place of an erasure frame in an exemplary embodiment of the invention.

FIG. 10 illustrates a method 1000 for transmitting an extra buffered frame caused by a retracted selection interval in place of an erasure frame in an exemplary embodiment of the invention, (assuming the erasure frame occurs first before a ⅛-rate frame does). Method 1000 will be discussed in reference to wireless communication network 100 of FIG. 1. The steps of method 1000 are not all-inclusive, and may include additional steps not shown for the sake of brevity.

In step 1002, frame selector 142 retracts the expanded selection interval, which occurs as described in method 700 of FIG. 7. For example, as illustrated in FIG. 9, frame selector 142 retracts the period of the selection interval during selection interval #7, causing an extra buffered best frame. Thus, at time t16 (i.e., the end of selection interval #7), frame selector 142 will still store best frame #7 in memory as it begins receiving frames for selection interval #8.

Figure 11:
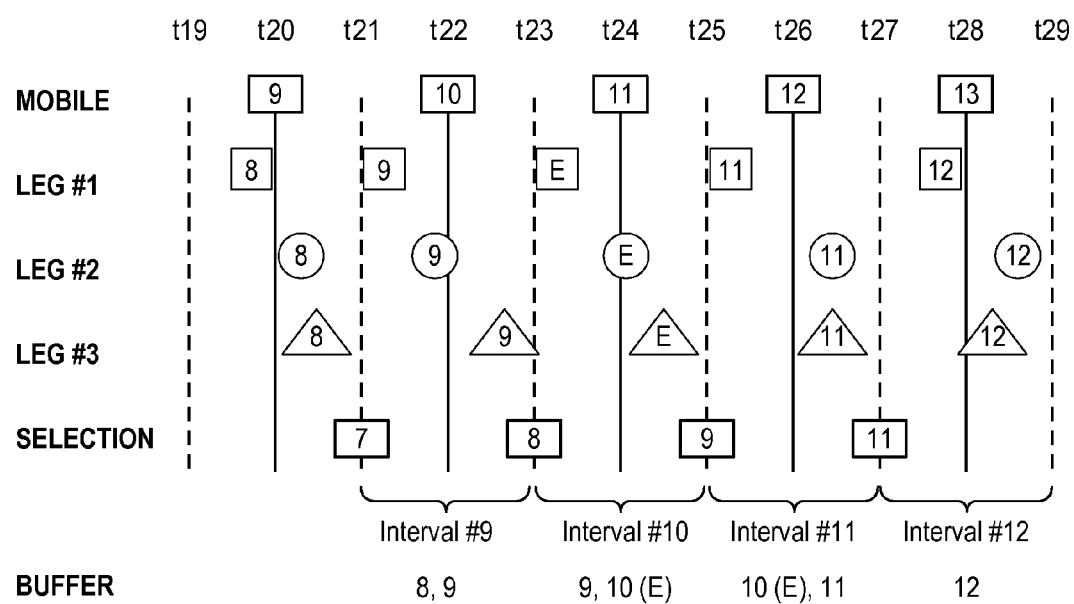
FIG. 11 illustrates a continuation of the timing diagram of FIG. 9 in an exemplary embodiment of the invention.

In step 1004, frame selector 142 determines when qualities of the frames received from base stations 120-124 during an instance of the initial selection interval are below a quality threshold. The quality threshold defines when an erasure frame is typically generated. In step 1006, frame selector 142 generates an erasure frame responsive to determining that the qualities of the frames are below the quality threshold. In step 908, frame selector 142 transmits the extra buffered best frame in place of the erasure frame. FIG. 11 illustrates a continuation of the timing diagram of FIG. 9. At time t23 (i.e., the end of selection interval #9), frame selector 142 transmits best frame #8 to the vocoder, and still stores best frame #9 in memory (which is an extra buffered frame). However, during interval #10, frame selector 142 detects an erasure frame (e.g., frame #10) received from legs #1-3 (e.g., base stations 120-124). In the illustrated frame sequence, best frame #10 would normally be transmitted at time t27. However, frame selector 142 can skip inserting and transmitting the erasure frame, and instead, transmit best frame #11 in place of the erasure frame. As a result, frame selector 142 eliminates the extra buffered frame, and gets back on track and proceeds with normal operation, such that best frame #12 will be transmitted to the vocoder at time t29, which is when best frame #12 would normally have been transmitted to the vocoder had no expansion of the frame interval ever occurred.

As a result of this method, extra buffered frames are transmitted to the vocoder at the least impacting moment during the call, with minimal impact on the conversation. In another embodiment where frame selector 142 receives a ⅛-rate frame first instead of low-quality frames (e.g. during interval #10 in FIG. 10), frame selector 142 may operate to replace a silence frame with an extra buffered frame (e.g. best frame #11) rather than the erasure frame described above. This process would essentially have the same effect on the call from the perspective of listener and the perspective of higher protocol layers (such as the vocoder), and has minimal impact on the content of the call.

Although specific embodiments were described herein, the scope of the invention is not limited to those specific embodiments. The scope of the invention is defined by the following claims and any equivalents thereof.

I claim:

1. A method for expanding a frame selection interval in a wireless communication network, the method comprising:
receiving a sequence of frames for a call from each of a plurality of base stations serving a mobile communication device for the call;
performing a frame selection process based on an initial selection interval to select a best frame from the sequence of frames received from each of the base stations during each instance of the initial selection interval;
detecting at least one outlier frame of the sequence of frames received from at least one of the base stations outside of the initial selection interval during at least one instance of the initial selection interval;

expanding the initial selection interval to an expanded selection interval responsive to detecting the at least one outlier frame; and
performing the frame selection process based on the expanded selection interval to select the best frame from the sequence of frames received from each of the base stations during subsequent instances of the expanded selection interval.

2. The method of claim 1 further comprising:
detecting that frames of the at least one of the sequences of frames are no longer being received outside of the initial selection interval during instances of the expanded selection interval;
retracting the expanded selection interval to the initial selection interval responsive to detecting that the frames of the at least one of the sequences of frames are no longer being received outside of the initial selection interval; and
performing the frame selection process based on the initial selection interval to select the best frame from the sequence of frames received from each of the base stations during subsequent instances of the initial selection interval.

3. The method of claim 2, wherein each of the sequence of frames comprises circuit- or packet-mode voice traffic, and the retraction of the expanded selection interval results in storage of an extra buffered best frame received from the plurality of base stations, and the method further comprises:
determining when qualities of the frames received from the base stations during an instance of the initial selection interval are below a quality threshold;
generating an erasure frame responsive to determining that the qualities of the frames are below the quality threshold; and
transmitting the extra buffered best frame to a vocoder or other network element in place of the erasure frame.

4. The method of claim 2, wherein each of the sequence of frames comprises circuit- or packet-mode voice traffic, and the retraction of the expanded selection interval results in storage of an extra buffered best frame received from the plurality of base stations, and the method further comprises:
determining when a silence frame is received from the base stations during an instance of the initial selection interval; and
transmitting the extra buffered best frame to a vocoder or other network element in place of the erasure frame.

5. The method of claim 1, wherein the expanded selection interval is expanded over the initial selection interval by a time based on a differential time period between a boundary of the initial selection interval and a time the at least one outlier frame is received from the at least one of the base stations.

6. The method of claim 5, wherein the at least one outlier frame is received early from the at least one of the base stations, and the boundary is a beginning boundary of the initial selection interval.

7. The method of claim 5, wherein the at least one outlier frame is received late from the at least one of the base stations, and the boundary is an ending boundary of the initial selection interval.

8. A frame selector in a wireless communication network, the frame selector comprising:
an interface system adapted to receive a sequence of frames for a call from each of a plurality of base stations serving a mobile communication device for the call;
a processing system coupled to the interface system and adapted to:
perform a frame selection process based on an initial selection interval to select a best frame from the sequence of frames received from each of the base stations during each instance of the initial selection interval;
detect at least one outlier frame of the sequence of frames received from at least one of the base stations outside of the initial selection interval during at least one instance of the initial selection interval;
expand the initial selection interval to an expanded selection interval responsive to detecting the at least one outlier frame; and
perform the frame selection process based on the expanded selection interval to select the best frame from the sequence of frames received from each of the base stations during subsequent instances of the expanded selection interval.

9. The frame selector of claim 8, wherein the processing system is further adapted to:
detect that frames of the at least one of the sequences of frames are no longer being received outside of the initial selection interval during each instance of the expanded selection interval;
retract the expanded selection interval to the initial selection interval responsive to detecting that the frames of the at least one of the sequences of frames are no longer being received outside of the initial selection interval; and
perform the frame selection process based on the initial selection interval to select the best frame from the sequence of frames received from each of the base stations during subsequent instances of the initial selection interval.

10. The frame selector of claim 9, wherein each of the sequence of frames comprises circuit- or packet-mode voice traffic, and the retraction of the expanded selection interval results in storage of an extra buffered best frame received from the plurality of base stations, and the processing system is further adapted to:
determine when qualities of the frames received from the base stations during an instance of the initial selection interval are below a quality threshold;
generate an erasure frame responsive to determining that the qualities of the frames are below the quality threshold; and
transmit the extra buffered best frame to a vocoder or other network element in place of the erasure frame.

11. The frame selector of claim 8, wherein each of the sequence of frames comprises circuit- or packet-mode voice traffic, and the retraction of the expanded selection interval results in storage of an extra buffered best frame received from the plurality of base stations, and the processing system is further adapted to:
determine when a silence frame is received from the base stations during an instance of the initial selection interval; and
transmit the extra buffered best frame to a vocoder or other network element in place of the erasure frame.

12. The frame selector of claim 8, wherein the expanded selection interval is expanded over the initial selection interval by a time based on a differential time period between a boundary of the initial selection interval and a time the at least one outlier frame is received from the at least one of the base stations.

13. The frame selector of claim 12, wherein the at least one outlier frame is received early from the at least one of the base stations, and the boundary is a beginning boundary of the initial selection interval.

14. The method of claim 12, wherein the at least one outlier frame is received late from the at least one of the base stations, and the boundary is an ending boundary of the initial selection interval.

15. A wireless communication network comprising:
- a plurality of base stations adapted to simultaneously receive call traffic from a mobile communication device and forward the call traffic as a sequence of frames;
- a backhaul network coupled to the base stations and adapted to transmit the sequence of frames for each of the base stations; and
- a frame selector coupled to the backhaul network and adapted to:
  - receive the sequence of frames from each of the base stations through the backhaul network;
  - perform a frame selection process based on an initial selection interval to select a best frame from the sequence of frames received from each of the base stations during each instance of the initial selection interval;
  - detect at least one outlier frame of the sequence of frames received from at least one of the base stations outside of the initial selection interval during at least one instance of the initial selection interval;
  - expand the initial selection interval to an expanded selection interval responsive to detecting the at least one outlier frame; and
  - perform the frame selection process based on the expanded selection interval to select the best frame from the sequence of frames received from each of the base stations during subsequent instances of the expanded selection interval.

16. The wireless communication network of claim 15, wherein the frame selector is further adapted to:
- detect that frames of the at least one of the sequences of frames are no longer being received outside of the initial selection interval during each instance of the expanded selection interval;
- retract the expanded selection interval to the initial selection interval responsive to detecting that the frames of the at least one of the sequences of frames are no longer being received outside of the initial selection interval; and
- perform the frame selection process based on the initial selection interval to select the best frame from the sequence of frames received from each of the base stations during subsequent instances of the initial selection interval.

17. The wireless communication network of claim 16, wherein each of the sequence of frames comprises voice traffic, and the retraction of the expanded selection interval results in storage of an extra buffered best frame received from the plurality of base stations, and the frame selector is further adapted to:
- determine when qualities of the frames received from the base stations during an instance of the initial selection interval are below a quality threshold;
- generate an erasure frame responsive to determining that the qualities of the frames are below the quality threshold; and
- transmit the extra buffered best frame to a vocoder or other network element in place of the erasure frame.

18. The wireless communication network of claim 16, wherein each of the sequence of frames comprises voice traffic, and the retraction of the expanded selection interval results in storage of an extra buffered best frame received from the plurality of base stations, and the frame selector is further adapted to:
- determine when a silence frame is received from the plurality of base stations; and
- transmit the extra buffered frame in place of the silence frame.

19. The wireless communication network of claim 15, wherein the expanded selection interval is expanded over the initial selection interval by a time based on a differential time period between a boundary of the initial selection interval and a time the at least one outlier frame is received from the at least one of the base stations.

20. The wireless communication network of claim 15, wherein at least one leg of the backhaul network comprises WiMax.

* * * * *